Oct. 18, 1955 W. H. BENNETT 2,721,271
RADIO FREQUENCY MASS SPECTROMETER
Filed Sept. 20, 1954 7 Sheets-Sheet 1

INVENTOR
WILLARD H. BENNETT
BY Moore and Hall
ATTORNEYS

Oct. 18, 1955 W. H. BENNETT 2,721,271
RADIO FREQUENCY MASS SPECTROMETER
Filed Sept. 20, 1954 7 Sheets-Sheet 3

INVENTOR
WILLARD H. BENNETT
BY Moore and Hall
ATTORNEYS

Oct. 18, 1955     W. H. BENNETT     2,721,271
RADIO FREQUENCY MASS SPECTROMETER Filed Sept. 20, 1954                          7 Sheets—Sheet 7

INVENTOR
WILLARD H. BENNETT
BY Moore & Hall
ATTORNEYS

United States Patent Office 2,721,271
Patented Oct. 18, 1955

2,721,271

RADIO FREQUENCY MASS SPECTROMETER

Willard H. Bennett, Fayetteville, Ark.

Application September 20, 1954, Serial No. 456,983

33 Claims. (Cl. 250—41.9)

This invention relates to radio frequency mass spectrometers, and more particularly it relates to a radio frequency tube which may be employed in the analysis or separation of ions having different masses.

It is an object of this invention to provide a novel tube wherein a mixture of gases having different masses may be separated into its various components.

It is a further object of this invention to provide a novel method of determining the gases which are present in a mixture of gases, and in further determining the amount of each gas which is present in said mixture.

Still another object of this invention is the provision of a new and novel apparatus employing selective radio frequency acceleration for the separation of ions having different masses.

Another object of this invention is the provision of a tube and associated circuits which may be employed in the analysis of either positively or negatively charged ions.

A still further purpose of this invention is the provision of a radio frequency mass spectrometer which utilizes very large ion currents as compared with those currents employed in prior art devices.

Another purpose of this invention is the provision of a mass spectrometer which is capable of scanning a mass range rapidly enough to yield a continuing presentation of the complete mass spectrum on a cathode ray oscilloscope screen.

Still another object of this invention is the provision of a mass spectrometer apparatus which may continuously monitor the complete mass spectrum and which may be used as an electronic control device for processes in which reacting gaseous materials are subject to rapid changes in composition.

A still further object of this invention is the provision of a mass spectrometer which need not employ slits or magnets, and in which the separation of masses is effected by the use of radio frequency alternating potentials.

These and other objects may be seen from the following description and correlative drawings in which.

In a typical embodiment of my invention, a sample of gas is introduced, at very low pressure, into the envelope E at one end of my tube, adjacent an ionizing cathode, through the medium of a gas leak or valve system L. It is to be understood that other methods of obtaining the ions to be analyzed may readily be employed and the ions to be analyzed by my apparatus will be known in general throughout the following description as the "ion source." The mass spectrometer itself takes the form of an elongated tube; a collector system is placed at the other end of the tube from the ion source and a plurality of grids are spaced between the two. To the grids are applied appropriate D. C. and radio frequency A. C. potentials, these potentials being so selected that the ions of different masses which pass through said grids will acquire varying amounts of energy. By the proper selection of potentials a preselected ionic mass will be accelerated more than the other masses present. The collector system or collector plate at the other end of the tube has applied to it a retarding potential sufficient to repel all ions approaching it but those of said preselected mass which alone have the required energy to reach the collector.

Figure 1:
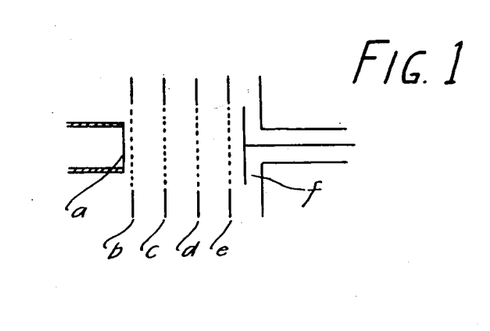
Figure 1 is a schematic representation of a single stage tube in accordance with my invention.

The foregoing operation will be more readily seen from the following description. Referring first to Figure 1, electrons from the filament $a$ are accelerated through a D. C. potential to the first grid $b$. Positive ions produced by collisions between these electrons and gas molecules in the tube between grids $b$ and $c$ are accelerated from $b$ toward $c$ with a potential difference V, between $b$ and $c$. The grids $c$, $d$, and $e$ are equally spaced at a distance $s$. A radio frequency field of angular frequency $\omega$ is applied to the middle grid $d$ giving an electric field between $c$ and $d$.

$$E_{cd} = E \sin (\omega t + \theta)$$

and between $d$ and $e$ $$E_{de} = -E \sin (\omega t + \theta)$$

where $t$ is zero at the instant an ion crosses the plane of grid $c$ and E sin $\theta$ is the value of the field $E_{cd}$ at that instant. We assume a uniform flow of ions up to grid $c$ so that there will be equal numbers of ions with each possible value of $\theta$. Some of these will receive energy from the fields as they pass the grids while others will lose energy to the fields. The collecting plate $f$ has a D. C. stopping potential which turns back all ions except those which have acquired nearly the maximum possible energy from the fields and which originated near the grid $b$.

An exact solution for the motion of a charged particle in the sinusoidal field is extremely complex. For purposes of this discussion, a small disturbance approximation will suffice. A "small disturbance approximation" means an approximation in which the effect of a small disturbance is computed, in this case the small disturbance being the small alternating electric field. Experiment has shown that this approximation holds quite well for finite amplitudes. It is assumed that the change in velocity of an ion as it moves through the grids is small compared to its initial velocity so that the effects of the applied fields on the transit time can be neglected. Space charge effects are also neglected with negligible error for this system.

In the following discussion the following definitions are used:

$m$ is the mass of the ion.

$E$ is the maximum value of the electric field between grids due to the alternating potential applied to one of the grids.

$e$ is the charge on the ion.

$\omega$ (omega) is the angular velocity of the alternating potential.

$v$ is the velocity of the ion.

The force acting on mass $m$ between grids $c$ and $d$ is:

$$F_{cd} = m\ddot{x} = Ee \sin(\omega t + \theta)$$

and between $d$ and $e$ is:

$$F_{de} = m\ddot{x} = -Ee \sin(\omega t + \theta)$$

where time $t$ is measured from the time the ion passes the grid $c$ and $\theta$ is the phase angle of the alternating potential on at the instant the ion passes $c$. Taking for a first approximation the case when the amplitude of the alternating potential is small compared with the D. C. potential $V$ used in accelerating the ion from the source to the grid $c$, the variations in the velocity of the ion due to the A. C. fields will be small compared with the average velocity of the ion between grids $c$ and $e$. The energy acquired from the alternating field is approximately:

$$\Delta W = \Delta(mv^2/2) = v \cdot \Delta(mv) = v \int F dt$$

The transit time for the ion to travel from one grid to the next is $s/v$ where $s$ is the distance between grids. Then:

$$\Delta W = v \left[ \int_0^{s/v} Ee \sin(\omega t + \theta) dt + \int_{s/v}^{2s/v} -Ee \sin(\omega t + \theta) dt \right]$$

$$\Delta W = \frac{Eev}{\omega} \left[ \cos \theta - 2\cos\left(\frac{s\omega}{v} + \theta\right) + \cos\left(\frac{2s\omega}{v} + \theta\right) \right]$$

This is a maximum with respect to variations in $\theta$ when $$(s\omega)/v + \theta = \pi = 180°$$

showing that the ions which pass grid $d$ just as the field reverses obtain maximum incremental energy. The expression for $\Delta W$ is a maximum with respect to variations in $\omega$ when $$\theta = 46° \text{ (more precisely } 46°26')$$

so the transit angle between grids is:

$$(s\omega)/v = 134°$$

The velocity of the ion receiving maximum incremental energy is obtained from:

$$eV = \tfrac{1}{2} M m_0 v^2$$

where $V$ is the potential difference between the ion source $b$ and the grid $c$; $M$ is the atomic mass number of the ion; and $m_0$ is the mass of an ion of unit mass number. Eliminating $v$ between the last two equations gives:

$$M = \frac{0.266 \cdot 10^{12} V}{s^2 f^2}$$

where $V$ is in volts, $s$ is in centimeters, and $f$ is in cycles per second.

Figure 2:
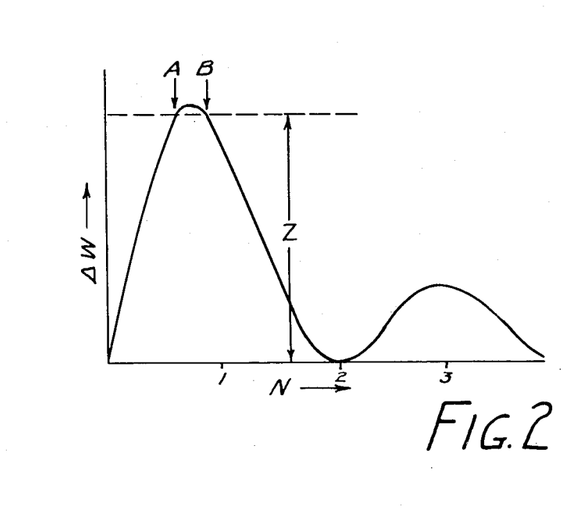
Figure 2 is a plot of the energy acquired by an ion in the single stage tube of Figure 1.

Shown in Figure 2 is the energy $\Delta W$, acquired by an ion passing the grid $d$ at 180° phase as a function of the number of cycles N executed by the alternating field while the ion travels from grid $c$ to grid $e$. The principal maximum of this curve is at $N = 0.74$ cycle because the transit angle from the first to the third grid for maximum $\Delta W$ is $$(2s\omega)/v = 267° = 0.74 \text{ cycle}$$

If the stopping potential applied in the collecting system corresponds to the energy Z, at the horizontal dashed line, the ions can be collected only at frequencies corresponding to positions in the graph between A and B. Ions passing the first grid at phase angles different from the optimum 46° angle acquire a lower energy and can reach the collecting electrode within a narrower range than the range between A and B. The ions collected are those at all phases of entry which can collect enough $\Delta W$ to exceed Z so the shape of the line observed for ions of a particular mass is sharper than that portion of the curve above Z.

It was found by experiment that the above approximate treatment was adequate if the D. C. potential difference between the source and the first grid was more than ten times the amplitude of the R. F. alternating potential, but that irregular curves for each mass component resulted at larger relative A. C. potentials. However, symmetric mass line forms resulted for A. C. potentials up to about half the D. C. potential, if the D. C. potential on grid $d$, to which the A. C. potential is added, is reduced by just the amount necessary to reduce the speed of an ion receiving maximum incremental energy, back to the same speed as that with which the ion passed grid $c$, and if the D. C. potential on grid $e$ were also similarly reduced below that of grid $d$.

A good example of this can be given in the case where the tube is used for resolving the negative atomic ions produced at the surface of a hot cathode. In this case the potentials applied were:

|  | Volts D. C. |
|---|---|
| Ion source $a$ | 0.0 |
| Grid $b$ | 10.0 |
| Grid $c$ | [1] 4.0 |
| Grid $d$ | −2.0 |
| Grid $e$ | −14.1 |
| Collector $f$ | 20.0 |

[1] Plus six volts (R. M. S.) A. C.

It will be noted that in this particular test, the stopping potential was applied to the fourth grid $e$ and not to the collector. A simple integration shows that if the grids were ideal grids (very small holes compared with the intergrid distance), the maximum incremental energy an ion could acquire from the R. F. fields would be about the same as would be acquired from a D. C. potential twice the R. M. S. value of the R. F. potential on the intermediate grid. Thus, the use of an R. F. potential of six volts requires stepping back the D. C. potential on each successive grid by about six volts in order to hold approximately constant the velocity of those ions receiving nearly maximum incremental energy. The value of the stopping potential, −14.1 volts, exceeds the value of a little less than −12 expected because the more positive potential of the adjacent electrodes reduces the magnitude of the potential of the middles of the holes in the stopping grid to less than that of the potential applied to that grid.

By appropriately selecting the D. C. potentials, this spectrometer tube serves equally well for separating positive or negative ions. Although no magnetic field is needed with this tube in separating positive ions, it is helpful to use a small magnetic field perpendicular to the axis of the tube when separating negative ions in order to confine the electrons from the source to the vicinity of the source. This prevents the formation of positive ions throughout the tube by the relatively large electron currents which would otherwise reach the vicinity of the stopping grid.

*Two stage tube*

Figure 3:
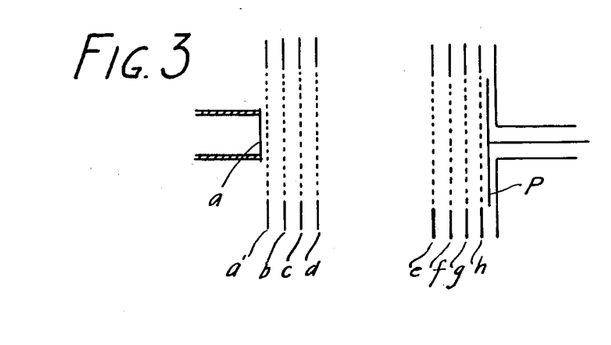
Figure 3 is a schematic representation of a two stage tube in accordance with my invention.

The method was extended to a two stage tube shown schematically in Figure 3. In this case the grids $b$, $c$ and $d$ serve as the first stage while grids $e$, $f$ and $g$ function as the second stage. The same radio frequency alternating potential is applied to grids c and f in addition to the two unequal D. C. potentials whose difference provides the compensation described previously in connection with the single stage tube. As before, the potential V accelerates the ions from the source $a$—$a'$ to the first grid b, and the D. C. potentials of grids c, d, f and g are similarly adjusted. The grids d and e are at the same potential so that the region between them is an equi-potential drift space. The stopping grid h and the collecting plate p function as before.

The distance between grids d and e is such that an ion receiving maximum incremental energy from the first stage will reach the initial grid of the second stage e at the right phase of the R. F. alternating potential to acquire a maximum incremental energy from the second stage also. In order to accomplish this the R. F. potential must execute exactly an integral number of cycles while the ion travels from stage to stage, or more exactly, from c to f, and so the distance from d to e must be $(2.70\ n-2)s$, where n is an integer, and s is the distance between the grids in each stage as before. The first two stage tube was built with $n=6$. This will be referred to as a six cycle two stage tube.

Figure 4:
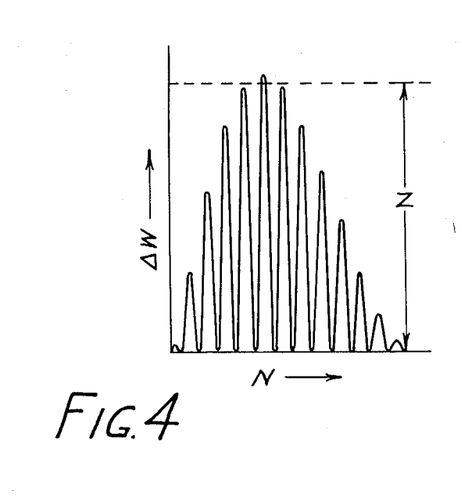
Figure 4 is a plot of the energy acquired by an ion passing through both stages of the tube of Figure 3.

The incremental energy which can be acquired by an ion from both stages of a two stage tube is illustrated in Figure 4. The envelope of the curve is the same kind of a curve as plotted in Figure 2 but with twice the ordinate, of course.

The foregoing description of one and two stage tubes is included herein merely for the purpose of explaining the background of this invention. My prior application Serial No. 45,163 filed August 19, 1948, entitled Radiofrequency Mass Spectrometer, now U. S. Patent No. 2,535,032, describes and claims the one and two stage tubes. That application was copending with my application Serial No. 196,024, filed November 16, 1950, entitled Radiofrequency Mass Spectrometer. The present application is a continuation of and was copending with the last-named application.

*Three stage tube*

Figures 5, 6:
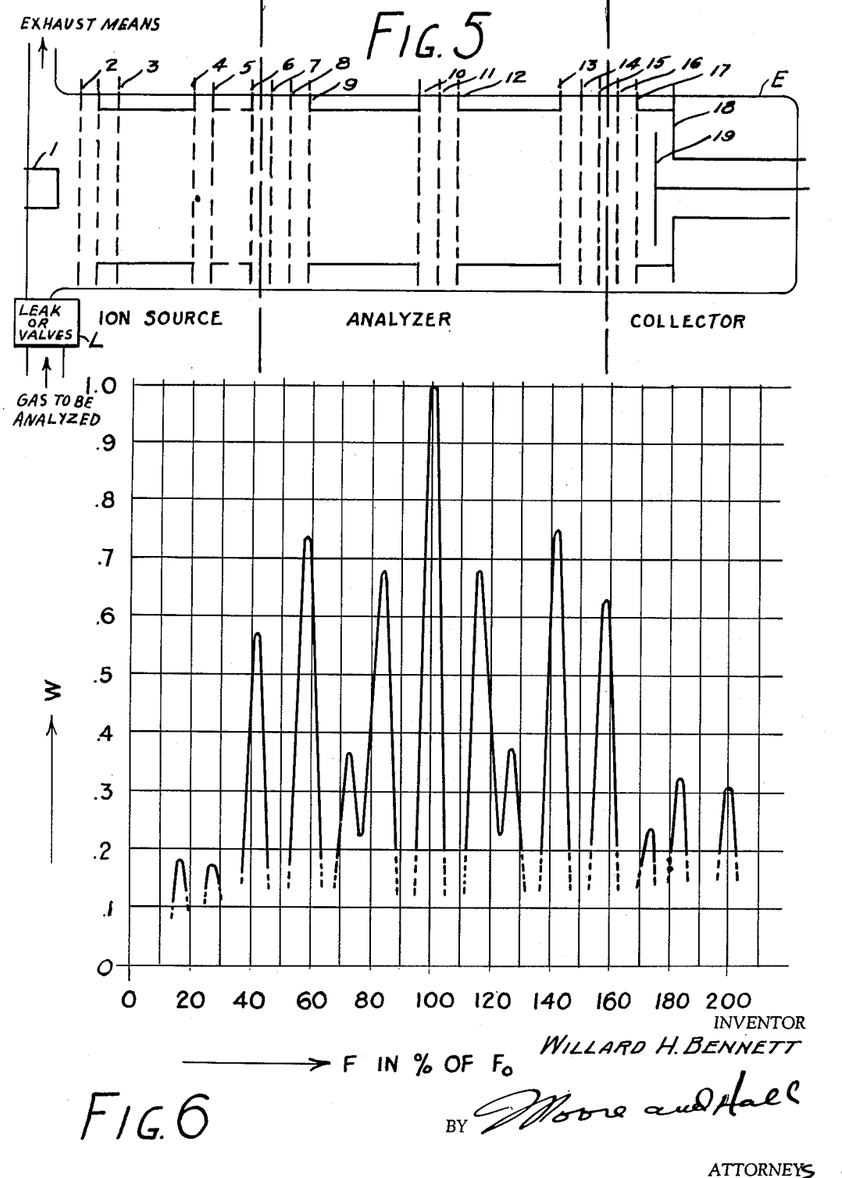
Figure 5 is a schematic representation of a three stage tube in accordance with my invention.
Figure 6 is a plot of the energy acquired by an ion passing through the three stages of the tube of Figure 5.

In order to retain much more sensitivity and at the same time produce only a single peak for each mass, a third stage is introduced. Such a tube is shown in Figure 5. The three stages must be spaced so that the R. F. alternating potential on the middle grid of each stage executes exactly integral numbers of cycles while the ion acquiring maximum incremental energy travels from stage to stage. These integral numbers between the two successive pairs of stages are so selected as to avoid any appreciable overlap of the harmonic peaks of the two pairs of stages considered as two stage combinations. When the integral numbers are so selected, much more of the principal peak can be left above the blocking potential Z than with either the single stage or two stage tubes and a corresponding increase in sensitivity is effected.

The tube of Figure 5 consists of the following principal parts: the ion source, the analyzer, and the collecting system. In the ion source electrons from the cathode 1 are accelerated through the grids 2, 3, 4 and 5 and are turned back before reaching grid 6 by a potential on grid 6 which is more negative than the potential of the cathode. Ions produced between 3 and 4 are drawn through 4 by a small negative potential on 5. These ions are then more strongly accelerated towards and through 6 by the much more negative potential on 6 and pass through the first grid 7 of the analyzer with a velocity determined by the potential difference between 7 and the grid cage 2, 3, 4 within which the ions were formed.

The first stage of the analyzer consists of the three grids 7, 8 and 9; the second stage of grids 10, 11 and 12; and the third stage of grids 13, 14 and 15. The radio frequency alternating potential is applied to the central grid of each stage i. e. on 8, 11 and 14. The distances between stages and between the grids in each stage in the analyzer are selected so that for each frequency there is only one velocity which an ion can have which will enable it to pass through each successive stage in phase with the alternating field and so to acquire sufficient energy to overcome the retarding potential at the collector. This is accomplished principally by making the ratio of the distances between stages precisely equal to the ratio of two integral numbers, the D. C. potentials being so adjusted as to keep the velocities of the ion approximately constant throughout the analyzer. An important but a little less critical requirement relates the distance between grids in each stage to the lengths of the equi-potential drift spaces between stages so that an ion which travels between the central grids of two successive stages while the radio frequency alternating potential has executed exactly the integral number of cycles will pass through each stage while the alternating potential has executed 267° of phase angle.

In the collecting system a retarding potential is applied which turns back all of the ions except the kind which had the correct velocity to pass through the successive stages in phase with the radio frequency alternating potential and to acquire the maximum energy from the alternating fields in each of those stages. The retarding potential can either be applied between the collector 19 and the ion source 2, 3, 4 or it can be applied between the ion source and either of the two grids 16 and 17 or both tied together.

The relationship between the mass number of the kind of ions reaching the collector, the principal D. C. voltage, the frequency, and the grid spacing in the stages as derived previously is:

$$M = \frac{0.266 \cdot 10^{12} V}{S^2 F^2}$$

where M is the mass number; V is the kinetic energy in electron volts of the ion while traversing the analyzer; S is the spacing between the grids in the stages; and F is the frequency.

The relationships giving the lengths of the drift spaces 9 to 10 and 12 to 13 respectively in Figure 1 are: $(2.70 n_1 - 2)S$; and $(2.70\ n_2 - 2)S$, where $n_1$ and $n_2$ are two different integers.

*Spacing of stages*

As an illustration of an approximate method for finding the spacing of stages which will give the best sensitivity, consider a steady flow of ions, all with the same initial velocity, passing through a three stage tube such as shown in Figure 5. First, consider those ions which pass through the central grid 11 of the second stage at 180° phase angle of the alternating potential which is applied simultaneously to grids 8, 11 and 14. As the frequency is varied, the energy $W_2$ acquired by these ions from the fields in the second stage varies with frequency. If the maximum amplitude X of the alternating potential applied to grid 11 is small compared with the D. C. potential used in accelerating the ions initially before they enter the analyzer, the velocity v of the ions can, to a first approximation, be considered constant in calculating the time taken by the ion to move from grid 10 to grid 11, or from grid 11 to grid 12, namely, $S/v$, where S is the distance between grids. Then the energy $W_2$ is:

$$W_2 = 2\int_0^{S/v} Ee\sin 2\pi Ft \cdot v dt = 2Xe\left[\frac{1-\cos 2\pi\frac{S}{v}F}{2\pi\frac{S}{v}\cdot F}\right]$$

As shown previously, the maximum of this function occurs at $$2\pi\frac{S}{v}F_0 = 133.5°$$

where the frequency $F_0$ is the frequency at this maximum of $W_2$. The maximum of the energy $W_m$ is $1.450.Xe$.

The energy $W_1$ acquired by the same ions while passing through the first stage is approximately $$W_2 \cdot \cos 2\pi n_1 \frac{F}{F_0}$$

where $n_1$ is the integer in the expression $(2.70\ n_1-2)S$ which gives the equi-potential drift distance between grids 9 and 10 in terms of the distance S between grids in the stages. Similarly, the energy $W_3$ acquired by these ions in the third stage is W $$W_2 \cdot \cos 2\pi n_2 \frac{F}{F_0}$$

where $n_2$ is the integer, a different one, for the second drift space between grids 12 and 13. The total energy W acquired by these ions from all three stages is then:

$$W = W_2 \left[ 1 + \cos 2\pi n_1 \frac{F}{F_0} + \cos 2\pi n_2 \frac{F}{F_0} \right]$$

and is plotted in Figure 6 for a seven and five cycle tube.

A simultaneous plot of the two cosine functions for a seven and five cycle tube reveals that the two functions reinforce each other at frequencies other than the fundamental where $$F/F_0 = 59\%,\ 84\%,\ 116\%\ \text{and}\ 141\%$$

and indeed when the retarding potential on the collector is made too small, it is just at these frequencies that the spurious peaks appear. Figure 6 shows these same harmonic positions and also shows that the smallest retarding potential that can be used with this tube is 75% of the potential needed to cut off the fundamental.

Figures 7, 8:
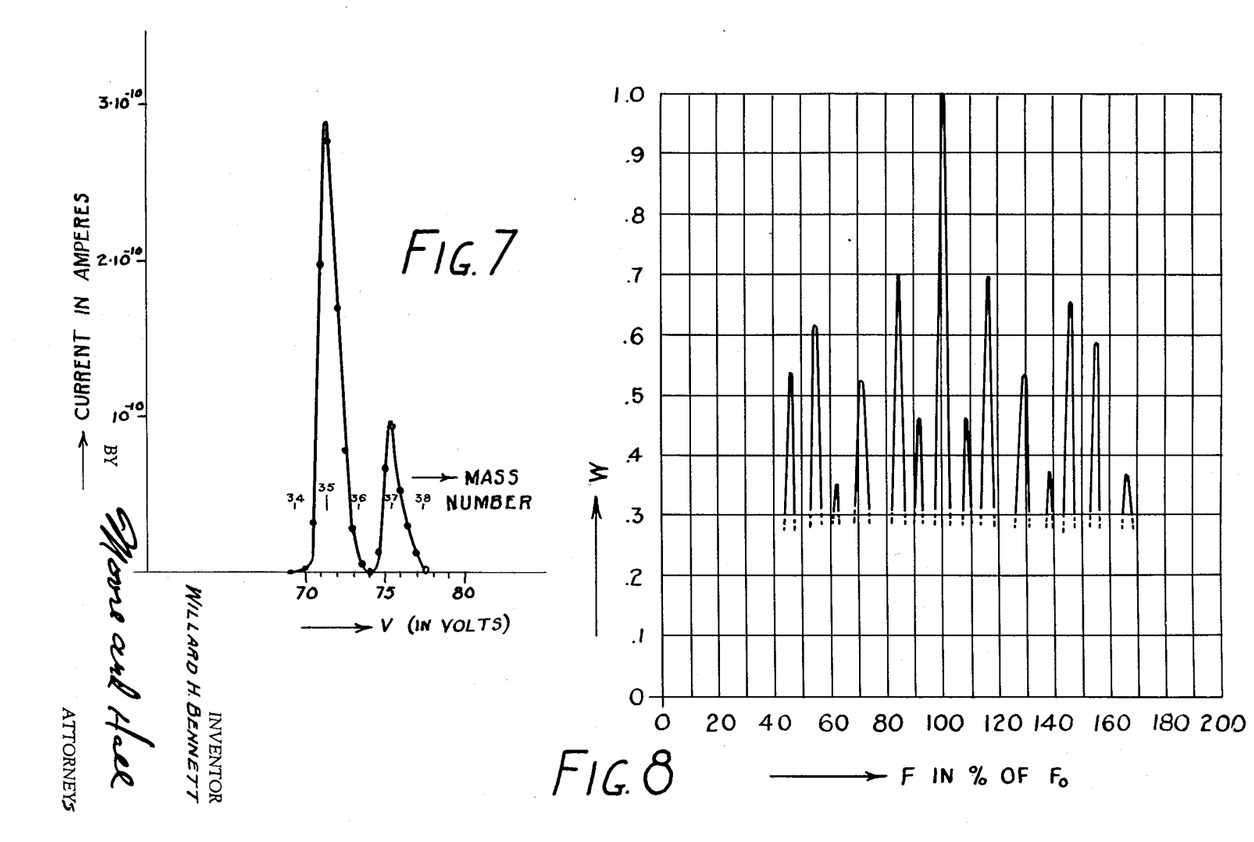
Figure 7 is a plot of a spectrum of the negative ions of chlorine when analyzed by a three stage tube.
Figure 8 is a plot of the energy acquired by an ion passing through a four stage tube in accordance with my invention.

An estimate can be made of the resolution attainable with the tube by examining the width of the fundamental peak in Figure 6 at the height just above the heights of the spurious peaks. It is seen that this line width is 4.3% on the frequency scale which corresponds to a line width of twice as much on a mass scale since the indicated mass varies inversely with the square of the frequency in this instrument. In Figure 7 is shown an experimentally observed spectrum of the negative ion of chlorine coming from an oxide coated cathode in a seven and five cycle tube in which the ion source of Figure 5 is replaced with a cathode yielding negative chlorine ions and in which polarities of potentials are reversed in order to observe negative ions instead of positive ions. It is seen that indeed the resolution of the analyzer of this tube is about 3%. However, when using this tube as a positive ion mass spectrometer, the spread in velocities of the ions coming from the ion source widens the lines as will be discussed later so the above figure is not in general realizable with this tube.

Before leaving this subject, it should be pointed out that increasing the number of stages from three to four permits the use of larger integers and the improvement of resolution is more than proportional to the number of stages. Figure 8 shows the form of W for a 13, 11 and 7 cycle tube. It is seen that the spurious peaks occur at 84% and 116% of the fundamental frequency for each mass and that a retarding potential of only 70% of that required to cut off the fundamental is permissible. Since the total cycles from first to last stage is thirty-one as compared with twelve for the seven and five cycle three stage tube, the resolution which is proportional should give line width of 1¼% on the mass scale except for the effects of velocity spread from the ion source.

In the above discussion it is specified that the spacings between stages are so selected that those ions which can acquire maximum energy from the R. F. fields in the stages, i. e. the resonant ions, pass from the middle grid of each stage (except the last stage) to the middle grid of the next stage while the R. F. potential on all middle grids executes integral numbers of cycles. The stopping potential in the collector turns back all ions except the resonant ions and it is the current of resonant ions to the collector which is measured and used for determining the intensity of the resonant mass in the ion source.

Whenever ions pass through one of the stages (of the type of mass spectrometer hereinabove discussed) in phase with a radio frequency alternating current applied to the middle electrode of a stage, that is so that ions pass the middle electrode at approximately the time that the radio frequency potential has a 180° phase angle, the ions gain energy from the radio frequency fields in that stage. This energy may be either kinetic energy or potential energy or some of both. For example, if the first and third electrodes of that stage are held at the same direct current potential, the ions will be accelerated and will have a greater velocity when passing the third electrode than they had when entering the stage through the first electrode. In this case the ions gain kinetic energy.

On the other hand, if the third electrode and the drift space following that electrode are held at a sufficiently lower direct current potential than the first electrode to slow down the ions by just as much as they otherwise would have been speeded up by the radio frequency fields in that stage, the ions emerge through the third electrode with just the same speed that they had when they entered through the first electrode and the energy which the ions gained by virtue of the work done upon them by the radio frequency field appears as potential energy of the ions when the latter emerge through the third electrode into the adjacent drift space. The potential energy of the ions arises by virtue of their position in the drift space which is surrounded by the electrodes whose direct current potential is lower than that of the first electrode. As the resonant ions, that is those ions which can pass through all stages approximately in phase with the radio frequency potential, pass through the analyzer, the energy gained from each stage, be it kinetic energy or potential energy, accumulates and it is this accumulated total energy, regardless of how much of it is kinetic and how much of it is potential energy which enables those resonant ions and no others to pass the retarding potential into the collector.

However, if the drift space between the first and second stages is held at the same potential as the drift space between the second and third stages, the resonant ions acquire energy from the R. F. fields in the second stage and consequently travel through the second drift space (between the second and third stages) at a greater velocity than they had while travelling through the first drift space. If the distance between the middle grid of the first stage and the middle grid of the second stage (first interstage distance) is to the distance between the middle grid of the second stage and the middle grid of the third stage (second interstage distance) as one integral number is to some other (different) integral number, then because the velocity of the resonant ions is greater in the second drift space than in the first drift space, those resonant ions traversing the first interstage distance in the first integral number of cycles of the R. F. cannot traverse the second interstage distance in the second integral number of cycles but will be travelling too fast for that.

It is to compensate for that kind of error in phase of arrival of the resonant ions at the third and any later stages that the D. C. potentials of the successive drift spaces are reduced by an amount to reduce the velocity of the resonant ions by just an amount sufficient to keep the velocity of the resonant ions approximately constant throughout the analyzer. Thus, although the R. F. fields in the second stage increase the energy of the resonant ions the potential difference between the first and second drift spaces takes kinetic energy away from ions passing from the first to the second drift space and stores this energy as potential energy.

It is not necessary in the practice of this invention to apply these D. C. potential differences between successive drift spaces, and when it is not done, it is necessary to lengthen the later interstage distances by enough to make the resonant ions travel each interstage distance during an integral number of cycles of R. F. potential. In the preferred form of this invention, the D. C. potentials are applied in such an amount that the kinetic energy taken away from the resonant ions and stored as potential energy is just equal to the kinetic energy which the resonant ions would have gained from the R. F. fields if the retarding D. C. potential differences between successive drift spaces had not been applied.

Although, in this preferred form of the invention, the D. C. potential differences are applied and velocity of the resonant ions remains the same in all drift spaces, nevertheless it should be stressed that the R. F. fields in all stages do change the energy of the resonant ions, this change of energy appearing either as a change in kinetic energy or in potential energy or in some of each, in the various parts of the various forms which this invention can take. The term energy as used in the disclosure and in the appended claims is not restricted to kinetic energy alone but includes both kinetic and potential energy. (NOTE.—This use of potential energy is entirely in accord with the definition of potential energy given in Webster's Dictionary under energy.)

Tying

In the previous discussion of the theory of this tube, it has been specified that the D. C. potential of each successive grid be reduced by an amount just sufficient to compensate the maximum energy that any ion could acquire in the preceding alternating fields so that these ions which would acquire maximum energy from the alternating fields would travel entirely through the analyzer at an approximately constant velocity.

In practice, however, it has not been found necessary to provide all these different D. C. potentials if the principal D. C. potential difference be applied between successive drift spaces to compensate the energy gain in each stage between drift spaces.

Figures 9, 10:
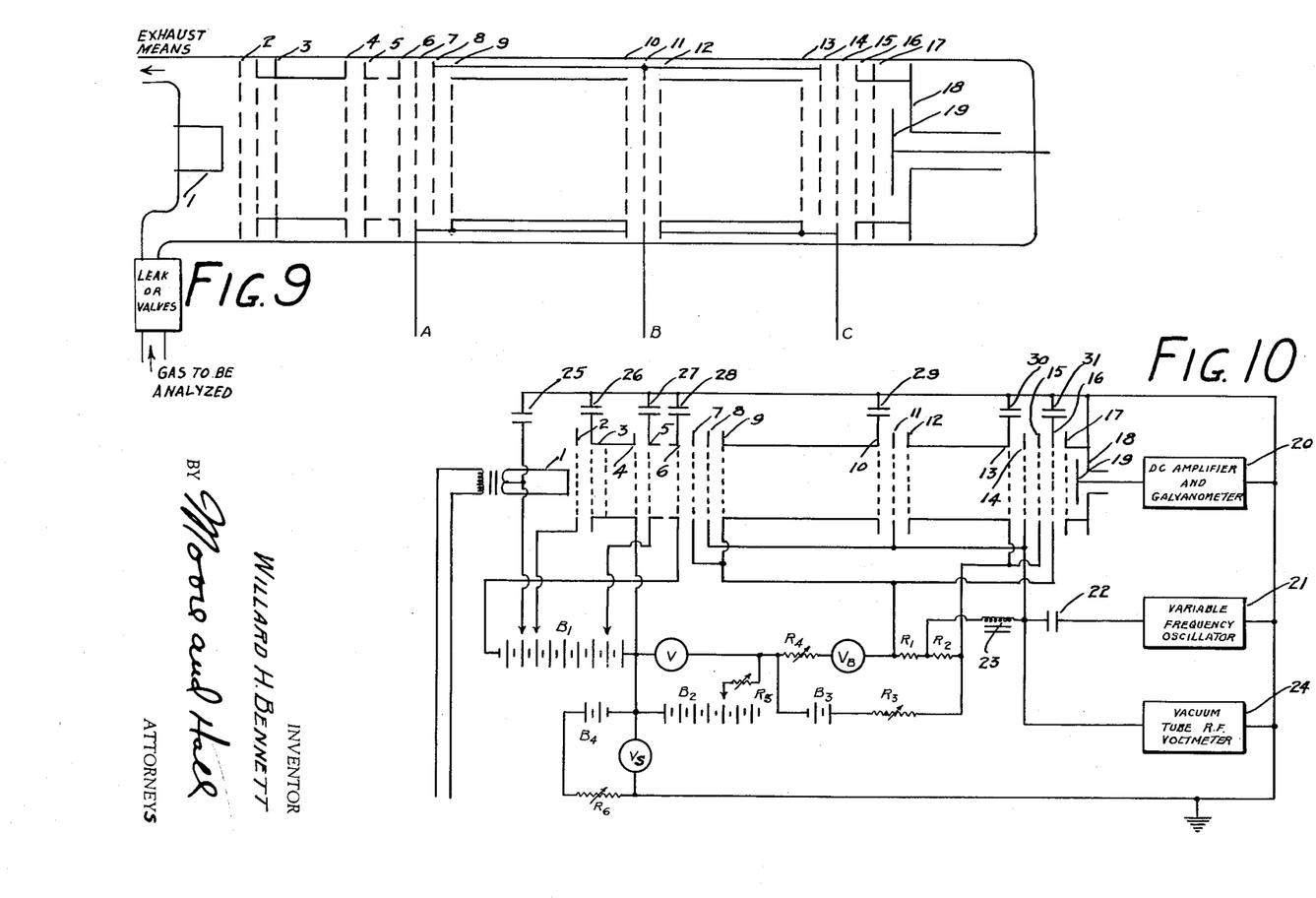
Figure 9 is a schematic representation of my three stage tube illustrating a method of interconnecting the grids within such a tube.
Figure 10 is a schematic diagram of the circuitry which may be employed with a three stage tube when said tube is to operate as a positive ion mass spectrometer.

One such method of interconnecting the grids inside the tube is shown in Figure 9. The D. C. grids 7, 9 and 10 are connected to an external lead A; the R. F. grids 8, 11 and 14 are connected to a lead B; and the D. C. grids 12, 13 and 15 are connected to lead C. Such interconnecting of grids inside the tube will be referred to as "tying." Tying reduces the number of separate leads which must be brought through the tube envelope E and also reduces the number of separate D. C. potentials at equal intervals which must be provided for operating the tube.

It is not practical to carry tying to the extent of interconnecting the drift spaces too, because when this is done, the increase in velocity in each later drift space results in higher spurious peaks which necessitate too high a retarding potential at the collector to leave as much sensitivity as is desirable. On the other hand, if each later drift space is lengthened in an attempt to compensate the increased ion velocity in each later drift space, it then becomes necessary to use radio frequency potentials with amplitudes which are kept proportional to the principal D. C. amplitude, and much of the flexibility of this instrument is lost.

Because the grids used in these tubes have relatively large openings and are consequently far from ideal grids, the effective maximum energy gain per stage is appreciably less than the theoretical value of 1.450 X$e$ mentioned earlier. A convenient method for establishing the D. C. biasing potential difference to be used between the successive drift spaces is to reduce the retarding potential until spurious peaks appear and to adjust the bias until the corresponding pairs of such peaks have the same height. Such a pair of peaks in the seven and five cycle tube to use for this purpose would be the two peaks occurring at 84% and 116% of the fundamental frequency.

Connections using batteries

Figure 10 shows one of several ways in which the tube can be connected in order to operate it as a positive ion mass spectrometer. In this example a storage battery $B_1$ is used as the power supply for the ion source, and heavy duty B-batteries are used for the D. C. supplies $B_2$, $B_3$ and $B_4$ for the rest of the tube. The filament is shown heated with a filament transformer. As filament it has been found convenient to use an 0.005" tungsten filament in the form of a flat spiral coated by cataphoresis with thorium dioxide. A potential difference between the filament 1 and the cage 3, 4 of about 80 volts is used, and the potential from cathode to grid 2 is adjusted to give a current of 0.1 ma. for a gas pressure in the tube of $10^{-4}$ mm., to 10 ma. for pressures of $10^{-6}$ mm., and lower. A drawing-out potential of about 10 volts negative relating to the cage is applied to the grid 5 and an electron repelling potential of about 100 volts negative relating to the cage is applied to grid 6.

The D. C. biasing potentials are applied using the bias potential meter $V_B$ and two equal resistors $R_1$ and $R_2$, the sum of whose resistance is the same as the resistance of the meter $V_B$. The amount of bias used is adjusted with $R_3$ and is initially set to give a reading on $V_B$ equal to about 1.8 times the R. M. S. value of the radio frequency alternating potential of the oscillator 21, a typical value of which is five volts, R. M. S.

The meter V connected as shown gives the principal D. C. voltage. This potential can be obtained as shown when frequency is to be varied, in order to reduce the drain on the battery $B_2$. Alternatively, if it is desired to hold the frequency constant and to vary V, it is more convenient to take this voltage from a potentiometer connected across more of $B_2$ than enough to give the maximum desired V.

The retarding potential is applied between the cage and ground because the collector is connected through the D. C. amplifier 20 to ground potential. The retarding potential is measured with $V_S$ and regulated with $R_6$. As an initial setting of $V_S$, about 4.5 times the R. M. S. value of the R. F. amplitude is usually used.

A variable frequency oscillator 21 supplies the radio frequency alternating potential through a 0.01 microfarad mica condenser 22 to the tied R. F. grids 8, 11, 14, while the D. C. level of those grids is established through an R. F. choke 23 from between $R_1$ and $R_2$ as shown. It is desirable to hold the amplitude of the R. F. alternating potential steady to within about 1% while varying the frequency and for this reason a vacuum tube R. F. voltmeter 24 is used for measuring the R. F. amplitude at the tube connected as shown.

All of the D. C. leads into the tube are by-passed to ground through 0.001 microfarad ceramic condensers 25–31. The resistance $R_4$ is initially set at zero.

Because this tube can be and usually is operated with no voltage greater than about 200 volts, contact potential differences can have an appreciable effect. For example, in the tube depicted in Figure 5, the grids are made with knitted tungsten wire while the woven screen that is used for the cylindrical walls around the drift spaces are made from Nichrome V. A contact potential difference between the tungsten and the Nichrome will cause the velocity of the ions to vary while the ions move through the drift space, the velocity midway through the drift space being different from that near the ends. This error in velocity will be different for the two drift spaces because the proportion of length to cross-section is different for the two. Such an error becomes increasingly important for smaller values of principal D. C. voltage V and in an extreme form can result in accentuating one or more spurious peaks seriously. For this reason after the biasing voltage has been set it is advisable to check this balance at a small value of V, such as 25 volts, to determine whether contact potential differences are present to a serious degree. It has usually been found that such contact p. d.'s can be compensated for by rebalancing at the lower value of V.

Ion sources

In the earlier experiments with this tube, the ions were produced between two grids between which a small potential difference was applied to drift the ions forward towards the analyzer. It was found that the best sensitivity was obtained when zero potential difference was applied between the grids. The sensitivity could further be increased by surrounding the space between the grids with a cylindrical conducting shield held at the same potential as the grids.

The explanation is as follows. The ionizing electrons en route through the space between the grids make the space more negative than the electrodes surrounding that space due to the space charge of these electrons. An ion formed by collisions between one of these electrons and a gas molecule cannot escape from this space unless the kinetic energy of the ion is sufficient to overcome the potential difference between the point in space where the ionization occurred and some place at the surrounding electrodes. These kinetic energies are mostly of the order of less than an electron volt, and consequently the positive ions accumulate in the interior of the ionization chamber until they have neutralized the electron space charge to within a potential difference of the order of a volt. As soon as this has occurred, ions begin to be drained off through a grid because of the penetration through the holes in that grid of the electrical potential of a negatively charged electrode near that grid.

In the earlier experiments the positive ions produced between the grids were drained forward by the next grid which was held at the potential V, and ions were also being drained off backwards because of the negative potential on the cathode. For this reason a double grid was introduced on the side towards the cathode as shown in Figure 5, in order to reduce this loss of ions on the side towards the cathode. No increase in sensitivity could be obtained by applying a potential difference between any of these grids or the wall, so these were all electrically connected together in the cage 2, 3, 4 referred to in the discussions of Figure 5.

A further increase in sensitivity was effected by introducing the additional grid 5 (see Figure 5) upon which could be applied a small negative potential, 10 to 20 volts, relative to the cage. Without this grid, the intense electric fields near the wires in the grids such as 4 or 5 where the ions might be moving slowly results in the ions being given large components of velocity away from parallel with the axis of the tube. Using grid arrangements as shown in Figure 5, the fields around the wires in the grids are kept small except at places where the ions have attained their larger velocities.

This method, of course, does not entirely avoid the effect of the fields around the wires in the grids scattering the ions away from parallel with the axis of the tube. A small further improvement in the sensitivity is obtained by using collars on grids 5 and 6 proportioned as shown in Figure 5.

Velocity spreads

Figure 11:
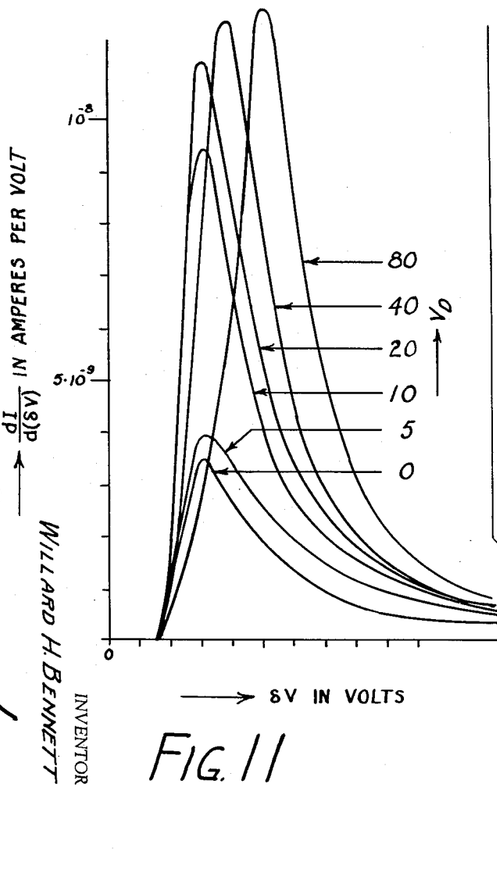
Figure 11 is a plot of the velocity spread of the ions passing through a tube in accordance with my invention.

The great advantage of this kind of ion source is of course the large ion currents that can be obtained. Increasing the drawing-out potential $V_D$, applied to grid 5 increases the ion current obtained but also increases the spread in velocity of the ions. In Figure 11 is shown a typical velocity spread with this source in which is represented the ion current per interval of one electron volt as a function of the difference $\Delta V$, in electron volts between the energy of the ions and the energy they would have had they originated with zero kinetic energy from a position having the electrical potential of the cage. The curves in Figure 11 are for various values of the drawing-out potential $V_D$.

Figure 12:
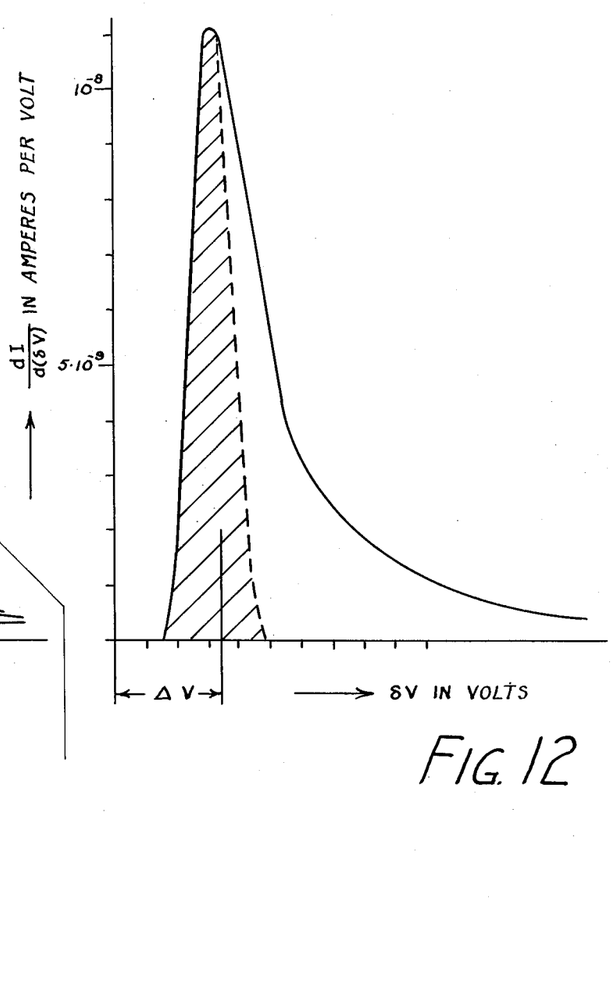
Figure 12 illustrates the sharpening of the velocity spread of Figure 11.

In this spectrometer the ions reach the collector by overcoming the retarding potential at the collector. The ions from the source which have the lower velocities are less able to pick up enough energy from the R. F. stages in the analyzer to overcome the retarding potential than are the ions leaving the source with the larger energies. For this reason, the effect of the selection produced by the retarding potential is to sharpen the velocity spread curves and an effective velocity spread such as shown in Figure 12 results. The average energy deficit $\Delta V$, of the ions in this effective spread represents the difference between the energy these ions have and the energy they would have had if they had originated with zero kinetic energy just at the potential of the cage. This value $\Delta V$ represents a "source correction" that must be applied to V in the formula for the mass given earlier:

$$M = \frac{0.266 \cdot 10^{12}(V - \Delta V)}{S^2 F^2}$$

and has the effect of making the mass appear to be too small.

As long as the same amplitude of the R. F. potential is used, a correction can readily be applied for this error by introducing a resistance $R_4$ as shown in Figure 10 and setting it so that its potential drop equals $\Delta V$, and reducing $R_3$ by just the same amount. When this is done, proper selection of frequency makes the meter for V direct reading in mass units with as good accuracy as the resolution of the tube justifies.

Collector system

The advantage of the large ion currents obtainable from the ion source is partially lost when D. C. amplification of the current to the collector is used. That part of the radiation from the ion source which goes to the vicinity of the collector ionizes the gas near the collector by processes which as yet have not been identified. It has been shown however that this ionization is approximately proportional to the square of the pressure and therefore probably is a two step ionization process. This produces both positive ions and electrons between the collector and the nearest grid and any electric field at the front of the collector causes a frequency independent background current with appropriate polarity to reach the collector.

In Figure 10, showing the connections to the tube when batteries are used for supplying the D. C. potentials, grid 16 was shown connected to the leading D. C. elements of the analyzer, and grid 17 was shown to be grounded. The connection for grid 16 is for the purpose of turning back any electrons which are produced in the analyzer and which otherwise would reach the collector. The connection for grid 17 is for the purpose of reducing the electric field intensity adjacent to the collector in order to reduce the background current. Except at the highest gas pressures it is not essential to connect grid 16 as shown, and alternatively, it is sometimes advantageous to ground grid 16 also in order further to reduce the field at the collector.

Figure 15:
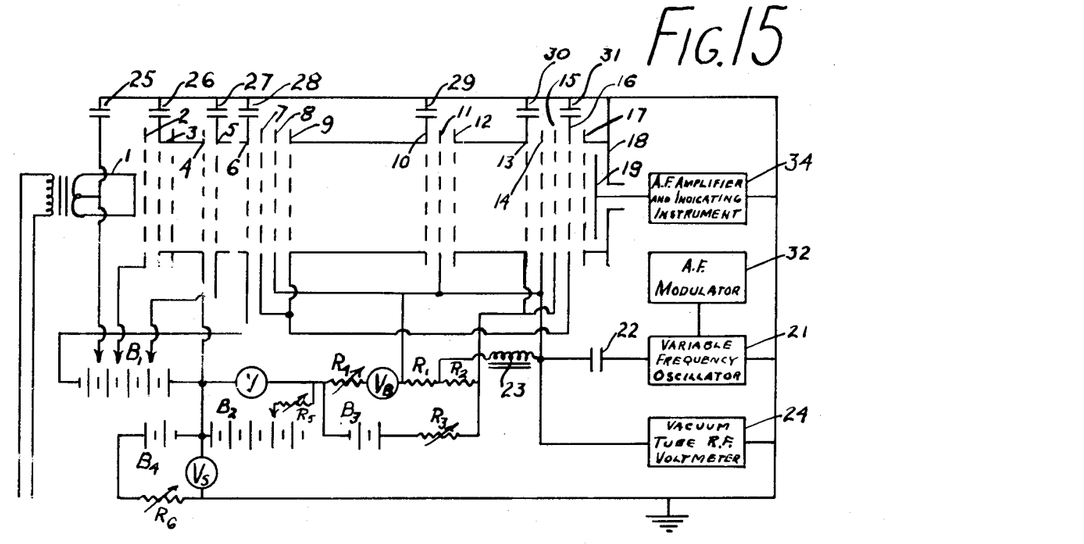
Figure 15 is a schematic diagram of a modified form of the invention.

The disadvantage due to the background currents can be overcome by using audio frequency A. C. amplification of the collector current as shown in Figure 15. This is done by modulator 32 which audio modulates the R. F. potential from oscillator 21, and using an A. C. amplifier 34 tuned to this audio frequency. The D. C. background current and also the noise is by-passed to ground through an LC circuit tuned to the audio frequency connected between the collector and ground, while the audio frequency A. C. component of the collector current is passed into the A. C. amplifier. Audio frequencies of 1,000 and 5,000 cycles per second have both been found to be effective.

Figure 16:
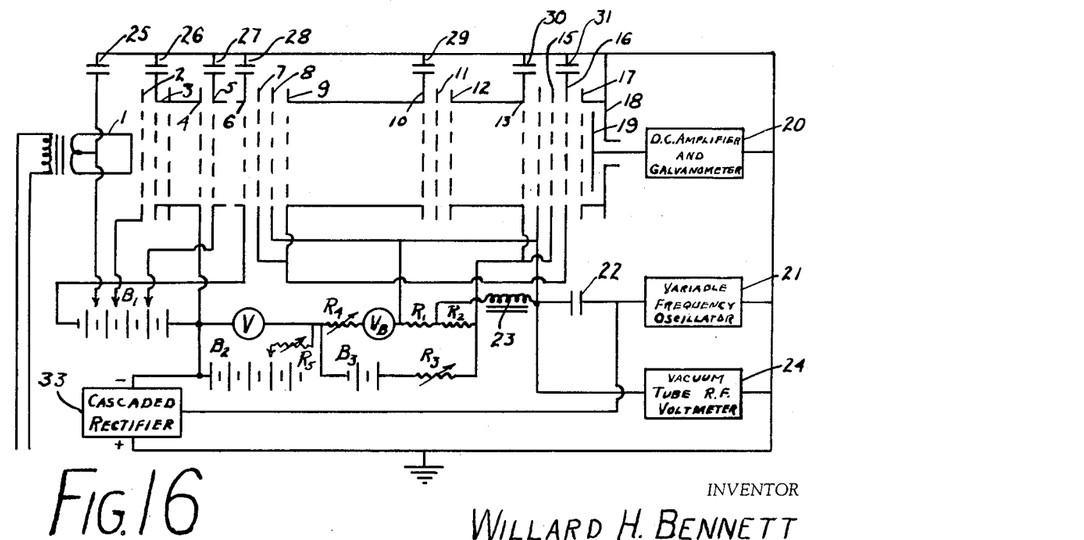
Figure 16 is a schematic diagram of another modified form of the invention.

The percentage of the ions from the source which can reach the collector depends upon the ratio between the retarding potential and the amplitude of the R. F. potential, and not upon either alone. For this reason, if as shown in Figure 16 the output of the oscillator 21 is appropriately rectified in a cascaded rectifier 33 (which replaces battery B4 of Figure 10) to give D. C. potentials proportional to the R. F. amplitude, such D. C. can be used as the retarding potential. This has been done by the usual electronic methods and results in an operation of the tube which is largely independent of unsteady R. F. amplitude from the oscillator.

Electronic power supplies have also been used in place of batteries so that all the power supplies for the tube were electronic. When this is done, it is helpful to check all the potentials applied at the tube not only with respect to the magnitude of the potentials applied, but also with regard to the leakage of A. C. potentials to electrodes which should be held at steady D. C. potentials.

Connections for negative ion analysis

Figure 13:
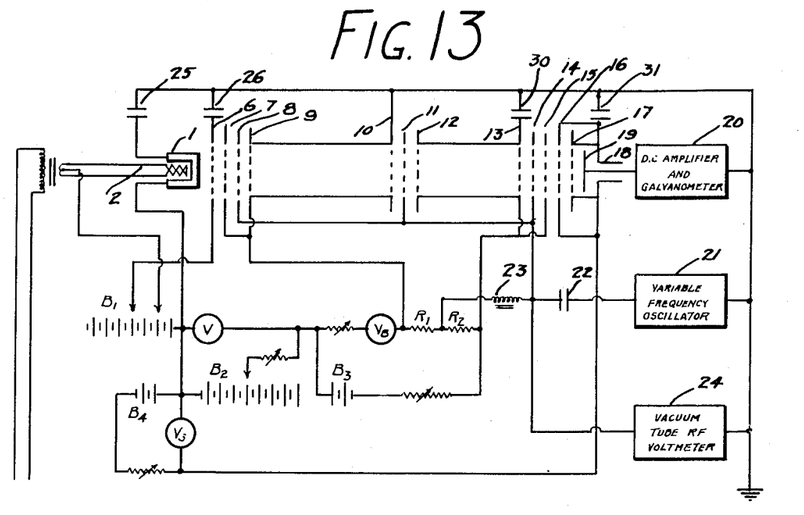
Figure 13 is a schematic representation of my three stage tube connected as a negative ion mass spectrometer.

Figure 13 shows one of the ways in which a tube can be connected for use as a negative ion mass spectrometer. In this illustration, the ion source is the face of an indirectly heated cathode 1 whose heater 2 is supplied from a transformer. A storage battery B1 is shown providing the D. C. potential for accelerating the negative ions produced at the face of the cathode.

The connections for electrodes 7 to 15 inclusive are the same as explained for the positive ion mass spectrometer except of course all polarities are reversed.

In a negative ion mass spectrometer, a weak magnetic field of about 20 gauss is applied approximately perpendicular to the tube near the cathode to hold back electrons from the cathode. This field is not critical and a U-shaped permanent magnet has been found quite adequate for this purpose.

The retarding potential is applied between the ion source 1 and the two grids 16 and 17 while the collector plate 19 is made to have the same potential as the leading D. C. grids 7, 9 and 10 by grounding the latter. Thus, it is seen that in this case the pair of grids 16, 17 is made to select the ions to reach the collector, while the potential on the collector serves to turn back any stray positive ions formed in the analyzer. This is given as only one way in which the connections in the collector system can be made, and alternatively, grid 16 could as well be connected to 7, 9, 10 as in the positive ion case, while the retarding potential from Vs and grid 18 are both grounded. In this case, of course, the ground shown at grid 10 would have to be replaced with a condenser.

Figure 14:
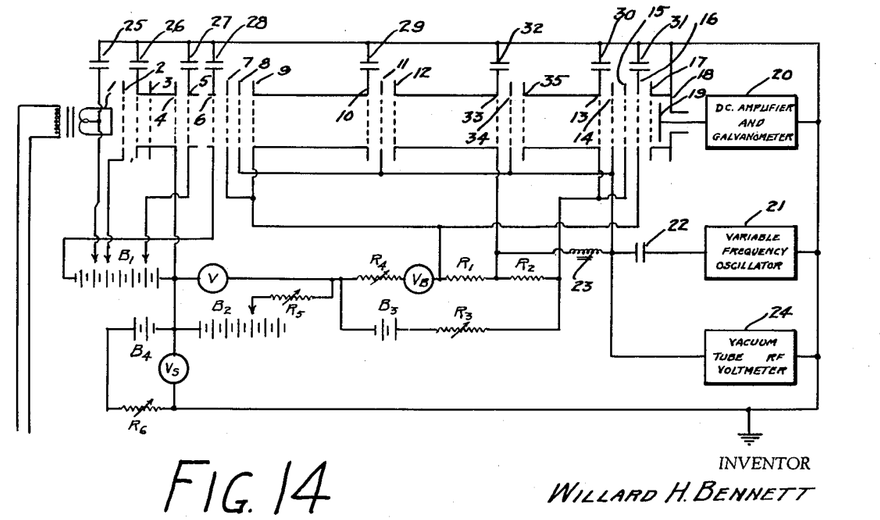
Figure 14 is a schematic representation of the circuitry to be utilized with a four stage tube in accordance with my invention.

In Figure 14 is shown an appropriate method for connecting a four stage tube such as the 13—11—7 cycle tube analyzed in Figure 8. The components serve analogous purposes to those explained in connection with Figure 10. It is to be noticed that the tied four stage tube requires only one more lead-out than required for the tied three stage tube. The additional stage in Figure 14 is represented by grids 33, 34 and 35. The capacitor 32 serves the same purpose as that of capacitors 25–31 described in reference to Figure 10.

Rapid scanning

The relatively very large ion currents available in this kind of mass spectrometer have made it possible to satisfy a need which has been recognized for years, namely, a mass spectrometer which can scan a mass range rapidly enough to yield a continuing presentation of the complete mass spectrum on a cathode ray oscilloscope screen.

This has been accomplished using audio modulation of the R. F. power at 1,000 cycles per second, and using A. C. amplification at this frequency. In the first test, the frequency was held fixed while the principal D. C. voltage V was traversed between 50 and 250 volts at a rate of two sweeps per second. This same voltage was also applied directly in the oscilloscope tube to give the horizontal deflection while the output of the A. C. amplifier was applied directly in the oscilloscope tube to give the vertical deflection. The mass range from 10 to 50 mass units was thus shown continuously.

When the gas surrounding the leak was changed suddenly, the previous mass spectrum collapsed and the new mass spectrum sprang up in its place within the time of the order of a second necessary for the new gas to enter the vacuum system through the leak.

Although the resolution of this instrument is somewhat poorer than that attained by mass spectrometers using the magnetic deflection of ion beams limited by slits at the source and the collector, the absence of slits in this instrument results in ion currents about 10,000 times as great as those obtainable in the magnetic types. This has in turn made possible new methods of operation and new kinds of application where no suitable instrument has previously existed.

Having thus described my invention, I claim:

1. A radio frequency mass spectrometer tube comprising an envelope having an inlet for admitting gas to be analyzed, said envelope surrounding all of the following parts, an ion source, a collector electrode, and at least three groups of electrodes disposed between the ion source and the collector electrode, each group including three closely spaced electrodes, the distances between said groups being large as compared to the distances between the electrodes of the groups themselves.

2. A radio frequency mass spectrometer tube comprising an envelope having an inlet for admitting gas to be analyzed, said envelope surrounding all of the following parts, an ion source, a collector electrode, and at least three groups of electrodes disposed between the ion source and the collector electrode, each group including three closely spaced electrodes, the distances between the middle electrodes being integral multiples of a unit of distance and large as compared with the spacing of the electrodes in the groups themselves.

3. A radio frequency mass spectrometer as defined in claim 2 in which the distance between the middle electrodes of the first and second groups is different than the distance between the middle electrodes of the second and third groups.

4. A multistage mass spectrometer tube comprising an ion source, a collector electrode, at least three groups of grids located between the ion source and the collector electrode, each group having three closely spaced grids displaced from each other along the line between the ion source and the collector electrode, an electrical connection between the middle grids of each group, another electrical connection between the first and third grids of the group closest the ion source which connection also connects to that grid of the next group which is closest to the ion source, another connection between the remaining grid of said next group and the two remaining grids of the next succeeding group, and an envelope surrounding all of the above-named parts, said envelope having an inlet for receiving the gases to be analyzed.

5. In a radio frequency mass spectrometer tube, a collector, an ion source comprising a cathode and three electrodes positioned in parallel planes that are perpendicular to the line between said cathode and collector, electrical connections for maintaining the first two of said three electrodes at substantially the same potential, the remaining electrode acting as a drawing-out electrode to attract positive ions when connected to a potential which is negative relative to the first two electrodes, and an envelope surrounding all of the foregoing parts, said envelope having an inlet for admitting the gas to be analyzed.

6. A radio frequency mass spectrometer comprising an ion source, a collector electrode, ion energy changing means having at least three devices producing radio frequency fields and located between the ion source and the collector electrode for successively changing the energy of certain ions more than others, an envelope surrounding all of the foregoing parts, means for measuring the current in the collector electrode due to the ions striking it, ion segregating means which when energized with proper direct current potential will segregate the ions passing said devices so that only those ions having energies in a predetermined range will reach the collector electrode, and means for applying radio frequency potential to said devices and a direct current potential to said ion segregating means and for so controlling these potentials as to enable the determination of the presence of as well as measurement of the intensity of at least one mass of an entire mass spectrum.

7. A radio frequency mass spectrometer tube comprising a cathode electrode, a collector electrode, and all of the following electrodes located between the cathode electrode and the collector electrode and positioned in planes perpendicular to the line between electrodes and located in the following order starting from the cathode, a first electrode immediately adjacent the cathode, three electrodes tied together electrically and with the first two of the three electrodes being immediately adjacent each other, two electrodes which may be connected to different potentials, at least three groups of electrodes with the middle electrodes of each group being spaced from each other by integral multiples of a given unit of distance, the distances between the first and second middle electrodes being different than the spacing between the second and third middle electrodes and the three electrodes of each group being closely spaced, an electrode which when connected to a proper potential will repel ions of less than a certain energy, an electrode immediately adjacent the collector electrode which when connected to a proper negative potential will repel electrons therefrom, and an envelope surrounding all of the foregoing parts and having an inlet for the gas to be analyzed.

8. A radio frequency mass spectrometer tube comprising a cathode electrode, a collector electrode, and at least four groups of electrodes disposed between the cathode electrode and the collector electrode, each group including three electrodes which are closely spaced relative to the distances between groups, and an envelope surrounding the foregoing parts, said envelope having an inlet for admitting gas to be analyzed.

9. A radio frequency mass spectrometer comprising an ion source including a cathode electrode, a collector electrode, electrode means located between said electrodes to change the energy of certain ions more than others, a source of radio frequency potential connected to said electrode means to energize the latter, means for modulating said radio frequency potential at a lower frequency rate, an amplifier connected to the collector electrode and tuned to the modulation frequency, and measuring means connected to the output of said amplifier.

10. A radio frequency mass spectrometer comprising an evacuated envelope having an ion source including a cathode electrode, at least three groups of electrodes with each group having three electrodes, the spacing between groups being large as compared to the spacing between electrodes of the groups, means for applying direct current potentials to the outer two electrodes of each group, radio frequency potential generating means for varying the potentials of the middle electrodes, and means for deflecting away from the collector electrode all ions that have passed said electrodes which failed to attain a predetermined energy and for measuring the flow of the ions that passed said electrodes in excess of said predetermined energy.

11. A radio frequency mass spectrometer comprising an envelope having an inlet for admitting the gas to be analyzed, an ion source in the envelope, a collector electrode in the envelope, at least three groups of electrodes in the envelope disposed between said ion source and said collector electrode, each group including three closely spaced electrodes the distances between said groups being large as compared to the distances between the electrodes of the groups themselves, an ion retarding electrode located between said electrodes and said collector electrode, means for applying direct current potentials to said ion retarding electrode and to the outer electrodes of said groups, measuring means for measuring the ion flow to the collector electrode, and radio frequency generating means for applying radio frequency potentials to the middle electrodes in proper phase relationships to change the energy of ions of certain masses more than those of other masses.

12. A radio frequency mass spectrometer comprising an envelope having an inlet for admitting the gas to be analyzed, an ion source in the envelope comprising a cathode and two spaced interconnected electrodes adjacent the cathode, said ion source also including an additional electrode more removed from the cathode than said two electrodes, means for applying a negative potential to said additional electrode which is negative relative to the other two electrodes, at least three groups of electrodes each having three electrodes in the group, the spacing between groups being large as compared to the spacing of electrodes within the groups, means for applying direct current potentials to the outer electrodes of each of the groups which are negative relative to said ion source, radio frequency potential generating means for applying potentials to the middle electrodes of each group which vary at radio frequency rates relative to the potentials of the other elements of the spectrometer, and means for measuring the ions passing said groups of electrodes with energy in excess of a predetermined amount comprising an electrode charged positively relative to the ion source, said groups of electrodes being positioned between the ion source and said last-mentioned electrode.

13. In a radio frequency mass spectrometer, an ion source including a cathode, means for changing the energy of ions of certain masses more than those of other masses comprising a plurality of control electrodes, a retarding electrode, means for applying direct current potential to the retarding electrode and for applying radio frequency potential to one of said control electrodes comprising a source of radio frequency potential connected to one of said control electrodes and rectifier means connecting said source to the retarding electrode, and means for measuring the flow of ions passing the first-named means with energy of a predetermined amount.

14. A radio frequency mass spectrometer comprising a negative ion source, at least three groups of electrodes with three electrodes in each group, the spacing between groups being large as compared to the spacing between electrodes in the groups, means for applying direct current potential to the outer electrodes of each group to render them positive relative to the ion source, a source of radio frequency potential connected to the middle electrodes for varying the potential of the latter relative to other parts of the system at a radio frequency rate, means for retarding flow of ions leaving the electrodes and for measuring the rate of flow of those in excess of a predetermined energy comprising an electrode biased negatively with respect to the ion source.

15. A radio frequency mass spectrometer comprising an ion source, at least one group of three electrodes, means for retarding ions and for producing potentials varying with the number of ions passing the electrodes with energy of a predetermined value, a source of radio frequency potentials connected to the middle electrode of the group, means for applying direct current potentials to the outer electrodes of said group, the last-named means including means for varying its potential over a given range, and means for displaying the magnitudes of the first-named potentials for the different values of the last-named potential.

16. A radio frequency mass spectrometer comprising an ion source having a cathode and first and second adjacent electrodes tied together, means for charging said electrodes positively relative to the cathode, a third electrode more remote from the cathode than the others, means for charging the third electrode negatively relative to the cathode to repel electrons coming from the cathode, analyzing means for changing the energy of ions of given masses that have passed the third electrode more than other ions of other masses, and measuring means responsive to the ion flow passing the analyzing means which has a predetermined energy.

17. A radio frequency mass spectrometer comprising an ion source having a plurality of electrodes, analyzer means having a plurality of electrodes, collector means, means for applying direct current potentials to certain of said electrodes, and condensers connecting some of these electrodes to ground, and a source of radio frequency potential connected to other electrodes of the analyzer means which have no condenser connecting them to ground.

18. A radio frequency mass spectrometer comprising an envelope having an inlet for admitting gas to be analyzed, an ion source in the envelope, a collector element in the envelope, at least three separate ion control means disposed between the ion source and the collector element, each ion control means including an electrode radio frequency potential generating means for applying potentials to said electrodes, the distances between said electrodes being so related to the phase of the potentials applied to the electrodes that the energy of ions of particular masses are successively changed at maximum rates by successive ion control means, and ion segregating and measuring means for measuring the flow of ions having energies in a predetermined range, the last-named means having means for producing a direct current potential to control the segregation of ions, the last-named means and the radio frequency potential generating means including means for controlling the potentials thereof with such accuracy that the measurement of the flow of ions will indicate the presence and intensity of ions of a particular mass in a sample of unknown gas fed into said inlet.

19. In a radio frequency mass spectrometer tube, an ion source comprising: a cathode, three electrodes tied together the two of which closest to the cathode being close together and having a short spacing compared to the distance between them and the third electrode, and a fourth electrode adjacent the third one and more remote from the cathode than the third one.

20. In a radio frequency mass spectrometer, an ion source, first, second and third spaced ion energy varying means for successively varying the energy of certain ions more than of others, each of said means including means for establishing a radio frequency field which determines the degree of energy variation of the ions passing that means, ion segregating and measuring means for indicating the flow of ions that have a predetermined energy, and means for so accurately controlling the radio frequency field and the segregation of the ions that the measurement will indicate the presence and amplitude of ions of a predetermined mass.

21. A radio frequency mass spectrometer comprising an ion source, a cathode, a collector electrode, at least four devices between the cathode and said electrode, each device including ion energy varying means which changes the energy of ions of a particular mass more than that of other masses, the spacing between two adjacent devices being different from the spacing between two others of the devices.

22. A four-stage radio frequency mass spectrometer as defined in claim 21 in which the spacings between all adjacent ones of said devices are different and are integral multiples of the same unit distance.

23. A four stage radio frequency mass spectrometer comprising an ion source including a cathode, four groups of grids of three grids each, the distance between groups being large compared to the spacing between grids of any one group, means including a collector electrode for collecting ions that have passed all the groups and attained a given energy, a radio frequency source connected to all of the middle grids of the groups, and means for applying direct current potentials to the outer grids of the groups of such value as to move the ions between adjacent groups in different time periods all of which are respectively equal to integral numbers of cycles of said radio frequency potential.

24. A radio frequency mass spectrometer comprising an envelope, at least three groups of electrodes with each group having three electrodes, the spacing between groups being large compared to the spacing between electrodes of a group, means for repelling ions that have passed said electrode which failed to attain a predetermined energy and for measuring the flow of the ions that passed said electrodes in excess of a predetermined energy, a source of radio frequency potential energizing the middle electrodes of the groups, and means for applying direct current potentials to the outer electrodes of the groups to allow ions of predetermined masses to pass between two adjacent groups of electrodes in a time period equal to a given number of complete cycles of said radio frequency potential and between two other adjacent groups of electrodes in a time period equal to a different number of complete cycles of said radio frequency potential.

25. A radio frequency mass spectrometer as defined in claim 11 in which the spacing between the first and second groups of grids and the spacing between the second and third groups are different integral multiples of the same unit of distance.

26. In a radio frequency mass spectrometer, an ion source, ion segregating and measuring means for indicating the flow of ions that exceed a predetermined energy, and first, second and third ion energy increasing means located between the ion source and the ion segregating and measuring means for successively increasing the energy of ions of a predetermined mass during their journey from the ion source to the ion segregating and measuring means, and means including a source of radio frequency energy for energizing the three ion energy increasing means to effect different times of flight of said predetermined ions between the first and second and the second and third ion energy increasing means.

27. In a radio frequency mass spectrometer, an ion source, ion segregating and measuring means for indicating the flow of ions that exceed a predetermined energy, and first, second and third ion energy increasing means located between the ion source and the ion segregating and measuring means for successively increasing the energy of ions of a predetermined mass during their journey from the ion source to the ion segregating and measuring means, and means including sources of radio frequency and direct current potentials for energizing the three ion energy increasing means to effect different times of flight of said predetermined ions between the first and second and the second and third ion energy increasing means.

28. A radio frequency mass spectrometer comprising an ion source, a three stage analyzer, means for applying direct current and radio frequency potentials to each stage and which are so related to each other and to the spacing of the stages that the time of flight between stages are different integral multiples of a unit time, and means for collecting and measuring ions that have passed the analyzer.

29. In a radio frequency mass spectrometer, an ion source, first, second and third spaced apart ion energy increasing means for successively increasing the energy of certain ions more than others, each of said means including means for establishing a radio frequency field which determines the degree of energy increase of the ions passing that means and each also including means for controlling the energy of the ions from the ion source to move particular ions from the first to the second ion energy increasing means in a time period equal to an integral number of cycles of said field and the same ions from the second to the third ion energy increasing means in a time period equal to a different integral number of cycles of said field, and ion segregating and measuring means for indicating the flow of ions that exceed a predetermined energy.

30. A mass spectrometer comprising an ion source having a cathode and first and second adjacent electrodes, means for charging said electrodes to substantially the same potential and positive relative to said cathode, and means including a negatively charged element for drawing the ions out of the space between said electrodes, said means including means for analyzing and measuring the ion flow.

31. A mass spectrometer as defined in claim 30 in which the last-named means includes a plurality of electrodes and a radio frequency source for controlling the potential on the electrodes.

32. A mass spectrometer as defined in claim 30 including a shield connected to the first and second electrodes and positioned around the space between them.

33. The device of claim 6 in which the last-named means includes measuring instruments energized by the radio frequency and direct current potentials respectively whereby the apparatus may be accurately adjusted so that a predetermined ion current indicates the presence of and a predetermined intensity of a particular mass.

References Cited in the file of this patent

UNITED STATES PATENTS 2,535,032    Bennett ________________ Dec. 26, 1950

OTHER REFERENCES

Physical Review, vol. 38, Dec. 1, 1931—"The Production of Heavy High Speed Ions Without the Use of High Voltages," by Sloan et al., page 2021.

Journal of Applied Physics, vol. 21, Feb. 1950—"Radio-frequency Mass Spectrometer," by Bennett, pages 143–149.

National Bureau of Standards News Bulletin, vol. 32, Sept. 1948—"Radio-Frequency Mass Spectrometer," pages 105–108.